June 7, 1932. F. W. PETERS 1,861,753
FLEXIBLE CONNECTION
Filed Oct. 15, 1928
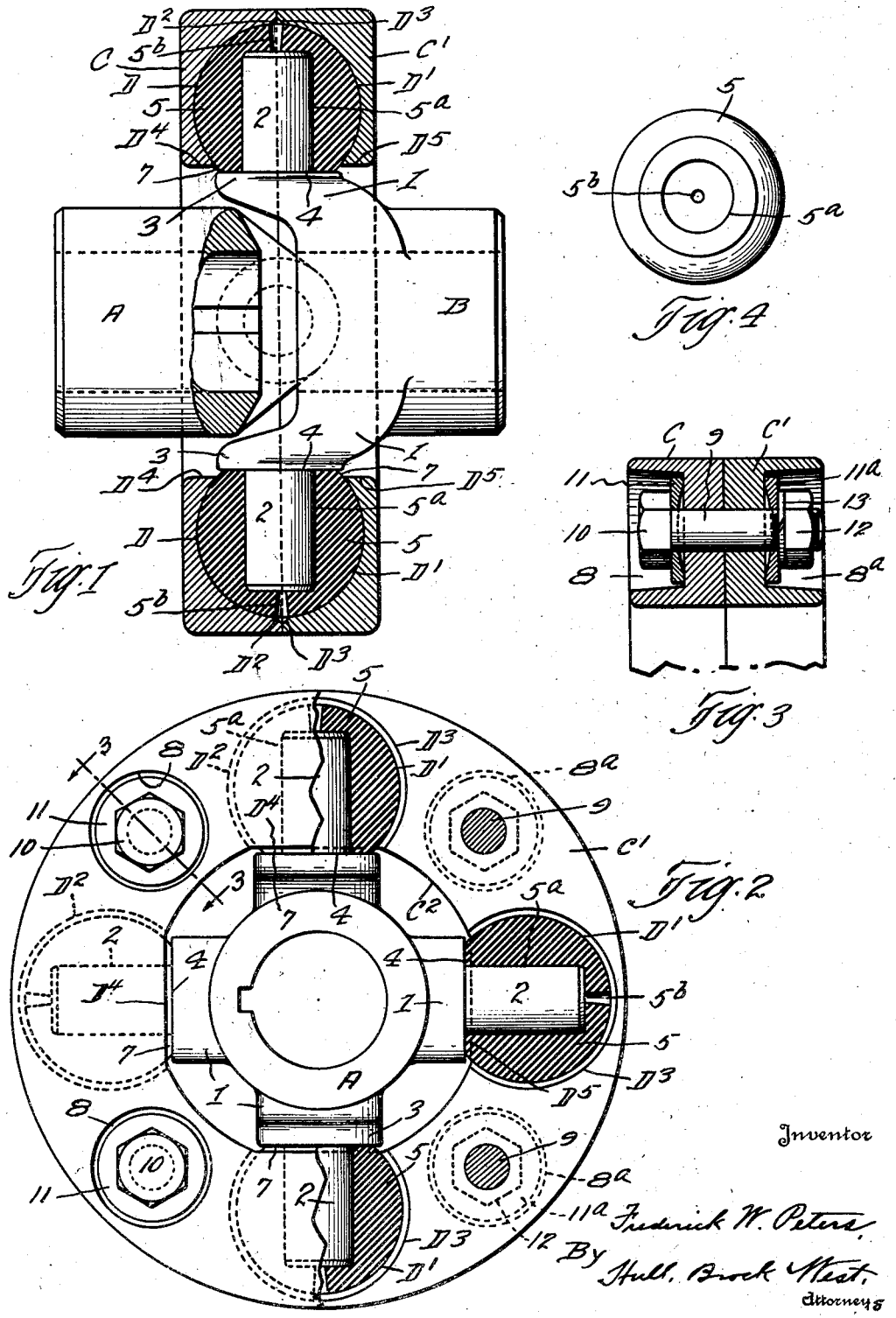

Patented June 7, 1932

1,861,753

UNITED STATES PATENT OFFICE

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO

FLEXIBLE CONNECTION

Application filed October 15, 1928. Serial No. 312,426.

This invention relates to flexible connections, such as universal joints, and has for its general object to provide a connection of this character which is efficient in operation while simple in construction and cheap of production.

The flexible connection is of the type wherein trunnion pins carried by the proximate ends of driving and driven members are united by a connecting member of the two-part ring type.

More limited objects of the invention are to provide flexible connections of this character with novel means for mounting the trunnions in the connecting member as well as with improved means for connecting the halves of such connecting member.

I accomplish the foregoing object, and other and more limited objects which will appear hereinafter, in and through the construction and arrangement of parts shown in the drawing, wherein Fig. 1 represents a sectional elevation of a flexible connection constructed in accordance with my invention, the section being taken approximately through diametrically opposed portions of the connecting ring and the parts assembled therein; Fig. 2, a view of said connection in end elevation, a part of the connecting ring being broken away; Fig. 3, a detail in section corresponding to the line 3—3 of Fig. 2; and Fig. 4, a detail in plan view of one of the resilient, deformable bearing blocks for the trunnions.

Describing the various parts by reference characters, A and B denote a pair of hubs which are adapted for connection to the driving and driven shaft sections with which they respectively cooperate. Each hub is provided with a pair of yoke arms 1, each arm having a trunnion 2 projecting from a shoulder 3, the shoulder having an annular seat 4 surrounding the base of the trunnion. The trunnions on each pair of yoke arms are 180° apart, as is usual in universal joint construction.

The trunnions are mounted in a connecting ring comprising two symmetrical annular sections C, C', each having symmetrical seats D, D' therein in the form of hollow segments of a sphere each in excess of a quarter sphere and so arranged that, when the ring sections are connected, complete seats are formed, each in the form of a hollow segment of a sphere in excess of a hemisphere, the inner end or base of each seat presented toward the center of the joint and spaced a short distance from the shoulder 3 and the seat 4 on the yoke arm which carries the trunnion mounted in such seat.

At the meeting edges of the ring sections C, C', each hemispherical seat is beveled outwardly, as shown at D2, D3. The purpose of this construction will be explained hereinafter.

Each ring section has a cylindrical outer surface and an inner surface composed of cylindrical surfaces $C^2$ alternating with flattened surfaces $D^4$ $D^5$ at right angles to radii drawn from the center of each segmental seat D' $D^2$ to the center of the base of such segment.

Mounted on each trunnion is a deformable, resilient bearing block 5 of the same general shape as the seats D, D'. Each such bearing block is composed preferably of vulcanized soft rubber and is slightly larger than the seat formed therefor in the assembled ring sections. Each block 5 has a cylindrical bore $5^a$ for the reception of a trunnion and a vent $5^b$ extending from the outer end of such bore through the said block. This vent enables the bearing blocks to be applied to the ends of their respective trunnions, permitting the air to escape as the blocks are slipped in place. The inner face of each bearing block engages the seat 4 provided therefor at the base of its trunnion pin, and the inner end of each bearing block projects inwardly beyond the inner surfaces D⁴, D⁵ of the connecting ring, as shown at 7.

The ring sections C, C' are provided with recesses 8, 8ª, which are preferably equi-distantly spaced from the adjacent bearing block seats and are connected together by means of bolts 9. Each bolt has a head 10 in one of the recesses 8, engaging an arched spring washer 11 in such recess, and a nut 12 in the opposite recess 8ª bearing against a similar spring washer 11ª, preferably through an interposed lock washer 13. By setting up the nuts 12, the washers are spread outwardly, transferring the pressure to the edges of their respective annular seats, thus securing an efficient clamping of the said ring sections together and clamping the bearing blocks 5 under a firm but yieldable pressure.

In practice, the spherical blocks 5 are slightly larger than the seats formed therefor in the connecting ring. This insures the compression of the blocks by the assembling of the ring sections and in tight engagement with their respective trunnions. Furthermore, the provision of the beveled surfaces D², D³ at the meeting edges of the portions of the ring sections which partially surround the seats, provides a space into which the corresponding parts of the blocks may be squeezed, thereby to accommodate any slight mis-alignment in assembling, as well as slight angular movements of the shaft sections with reference to each other. The unenclosed part 7 of each block contributes to this same result.

In practice, the beveled surfaces D², D³ have been made from $\frac{1}{32}$ to $\frac{1}{16}$ inch wide, and the width of the unenclosed portion 7 of each block will be approximately the same as the width of each such beveled surface.

By virtue of the construction described and illustrated herein, I have produced a flexible connection comprising a small number of parts and which may be very easily assembled and disassembled. I have also produced a connection which is inexpensive of production, but which will accomplish efficiently the results for which it is intended.

Having thus described my invention, what I claim is:—

1. A flexible connection comprising driving and driven members each having yoke arms, and trunnions carried by said arms, a connecting ring comprising a pair of annular sections each having partial seats therein adapted, when the said sections are connected, to form complete seats each comprising a chamber closed at its outer end, a bearing block of deformable resilient material surrounding each trunnion and shaped to substantially fit a seat provided therefor in said ring, and means for securing the ring sections together, the parts of said blocks which are so fitted within the seats being normally larger than said seats whereby they are held under compression by the said seats and in tight engagement with their respective trunnions.

2. A flexible connection comprising driving and driven members each having yoke arms, and trunnions carried by said arms, a connecting ring comprising a pair of annular sections each having seats therein adapted, when the said sections are assembled, to form seats each in the shape of a sphere segment in excess of a hemisphere with the base presented toward the center of the ring, a bearing block mounted on each trunnion and composed of deformable resilient material and each in the shape of a sphere segment and adapted to fit a seat provided therefor in the assembled ring sections, and means for connecting the said ring sections, each bearing block having a bore for the reception of a trunnion pin and a vent extending from the outer end of such bore through said block.

3. A flexible connection comprising driving and driven members each having yoke arms, and trunnions carried by said arms, a connecting ring comprising a pair of annular sections each having partial seats therein adapted, when the said sections are assembled, to form complete seats, a bearing block mounted on each trunnion and composed of deformable resilient material adapted to fit the seats provided therefor in the assembled ring sections, and means for connecting the said ring sections, each bearing block having a bore for the reception of a trunnion pin and a vent extending from the outer end of such bore through said block.

4. A flexible connection comprising driving and driven members each having yoke arms and trunnions carried by said arms, a connecting ring comprising a pair of annular sections each having partial seats adapted, when the said sections are assembled, to form complete seats, a bearing block mounted on each trunnion and composed of deformable resilient material adapted to fit the seats provided therefor in the assembled ring sections, and means for connecting the said ring sections, the partial seats in the sections being provided at their meeting edges each with an outwardly extending surface providing, when the ring sections are assembled, an outwardly extending groove surrounding the corresponding part of the bearing block therein.

5. A flexible connection comprising driving and driven members each having yoke arms, and trunnions carried by said arms, a connecting ring comprising a pair of annular sections each having seats therein adapted, when the said sections are assembled, to form seats each in the shape of a sphere segment in excess of a hemisphere with the bases of the segments presented toward the center of the ring, a bearing block mounted on each trunnion and composed of deformable resilient material and each in the shape of a sphere segment and adapted to fit the seats provided therefor in the assembled ring sections, and means for connecting the said ring sections, the partial seats in the sections being provided at their meeting edges each with an outwardly beveled surface providing, when the ring sections are assembled, an outwardly extending V-shaped groove surrounding the corresponding part of the bearing block therein.

6. A flexible connection comprising a driving and a driven member each having a pair of yoke arms, and a trunnion extending outwardly from each yoke arm, there being an annular seat surrounding the inner end or base of each trunnion, a connecting ring comprising a pair of annular sections each having substantially hemispherical seats extending thereinto from the inner wall thereof, the inner walls of the ring sections being spaced from the annular seats on the yoke arms, a substantially spherical bearing block of deformable elastic material mounted on each trunnion, each said block having an annular face adapted to engage the annular seat provided therefor, and means for connecting the said ring sections, the portion of each block which is fitted in the seat therefor being normally somewhat larger than said seat whereby each block is compressed within its seat.

7. A flexible connection comprising a driving and a driven member each having a pair of yoke arms, and a trunnion extending outwardly from each yoke arm, there being an annular seat surrounding the inner end or base of each trunnion, a connecting ring comprising a pair of annular sections each having substantially hemispherical seats extending thereinto from the inner wall thereof, the inner walls of the ring sections being spaced from the annular seats on the yoke arms and the partial seats in said sections being provided at their meeting edges each with an outwardly extending surface providing, when the ring sections are assembled, an outwardly extending groove, a substantially spherical bearing block of deformable elastic material mounted on each trunnion and being normally somewhat larger than the seat formed therefor by assembling the said ring sections, each said block having an inner annular face adapted to engage the annular seat provided therefor, and means for connecting the said ring sections.

8. A flexible connection comprising a driving and a driven member, each having trunnions projecting therefrom, a connecting ring comprising a pair of symmetrical annular sections each having partial seats therein adapted to form bearing block seats when the said sections are assembled, bearing blocks on said trunnions each consisting of a body of deformable, resilient material, the portion of each block which is received in a seat being normally larger than such seat, and means for connecting the said ring sections, the said means comprising pairs of opposed recesses in the said sections, each recess having an annular seat, a bolt for each pair of opposed recesses and having its head in one of such opposed recesses and a nut on the other end of said bolt in the other of such opposed recesses, and an arched spring washer in each recess through which such bolt extends, each washer being arranged with its concavity presented toward a cooperating annular seat whereby the pressure due to setting up the nut on each bolt is transferred to the parts of the opposed seats engaged by the outer edges of said washers, the pairs of opposed recesses in the ring sections alternating with the bearing block seats formed therein.

9. A flexible connection comprising a driving and a driven member each having trunnions projecting therefrom, a connecting ring comprising a plurality of sections having partial seats therein adapted, when the said sections are assembled, to provide complete bearing block seats, bearing blocks of deformable resilient material on said trunnions within and substantially fitting the said seats, the parts of the bearing blocks which are so fitted within the seats being normally larger than the said seats, and means yieldingly connecting the said ring sections and holding the said blocks under compression by the said seats.

10. A bearing block for the trunnions of driving and driven members which are connected by a ring comprising two sections adapted, when drawn together, to form seats each in the form of a segment of a sphere in excess of a hemisphere, the said bearing block being also in the shape of a segment of a sphere in excess of a hemisphere and having a bore extending thereinto from the inner end thereof adapted to receive one of such trunnions and adapted to be received in one of said seats, the said bearing block being made of deformable elastic material and being normally of greater external area than the internal area of the cooperating seat whereby, after the ring sections are drawn together, the bearing block will be compacted between its trunnion and the inner wall of its seat.

11. A bearing block for the trunnions of driving and driven members which are connected by a ring comprising two sections adapted, when drawn together, to form seats each in the form of a segment of a sphere in excess of a hemisphere, the said bearing block being also in the shape of a segment of a sphere in excess of a hemisphere and having a bore extending thereinto from the inner end thereof adapted to receive one of such trunnions and adapted to be received in one of said seats, the said bearing block being made of deformable elastic material and being normally of greater external area than the internal area of the cooperating seat whereby, after the ring sections are drawn together, the bearing block will be compacted between its trunnion and the inner wall of its seat, the said bearing block having a vent opening extending from the outer end of the bore thereof through the outer surface thereof.

In testimony whereof, I hereunto affix my signature.

FREDERICK W. PETERS.